(12) United States Patent
Poddany et al.

(10) Patent No.: US 6,959,517 B2
(45) Date of Patent: Nov. 1, 2005

(54) PHOTOVOLTAIC PANEL MOUNTING BRACKET

(75) Inventors: James J. Poddany, Northwood, OH (US); George L. Bukovinszky, Jr., Waterville, OH (US)

(73) Assignee: First Solar, LLC, Perrysburg, OH (US)

( * ) Notice: Subject to any disclaimer, the term of this patent is extended or adjusted under 35 U.S.C. 154(b) by 53 days.

(21) Appl. No.: 10/434,459

(22) Filed: May 9, 2003

(65) Prior Publication Data

US 2004/0221524 A1 Nov. 11, 2004

(51) Int. Cl.⁷ .............................................. E04D 13/18
(52) U.S. Cl. .............................. 52/173.3; 52/204.597; 52/746.11
(58) Field of Search ............................... 52/173.3, 200, 52/202, 204.597, 204.591, 204.72, 775, 764, 52/475.1, 780, 204.593, 746.11, 746.1; 136/251

(56) References Cited

U.S. PATENT DOCUMENTS

| | | |
|---|---|---|
| 3,769,091 A | 10/1973 | Leinkram et al. |
| 4,040,867 A | 8/1977 | Forestieri et al. |
| 4,114,595 A | 9/1978 | Barker |
| 4,189,881 A | 2/1980 | Hawley |
| 4,239,555 A * | 12/1980 | Scharlack et al. .......... 136/251 |
| 4,263,896 A | 4/1981 | Zebuhr |
| 4,321,416 A | 3/1982 | Tennant |
| 4,336,413 A | 6/1982 | Tourneux |
| 4,389,533 A | 6/1983 | Ames |
| 4,426,999 A | 1/1984 | Evans et al. |
| 4,594,470 A | 6/1986 | Headrick |
| 4,674,244 A | 6/1987 | Francovitch |
| 4,677,248 A | 6/1987 | Lacey |
| 4,760,680 A | 8/1988 | Myers |
| 4,835,918 A | 6/1989 | Dippel |
| 4,860,509 A | 8/1989 | Laaly et al. |
| 4,886,554 A | 12/1989 | Woodring et al. |
| 4,907,915 A | 3/1990 | Nicholson et al. |
| 4,936,063 A | 6/1990 | Humphrey |
| 4,937,990 A | 7/1990 | Paquette |
| 4,966,631 A | 10/1990 | Matlin et al. |
| 5,092,939 A | 3/1992 | Nath et al. |
| 5,112,408 A | 5/1992 | Melchior |
| 5,143,556 A | 9/1992 | Matlin |
| 5,164,020 A | 11/1992 | Wagner et al. |
| 5,228,924 A | 7/1993 | Barker et al. |
| 5,248,349 A | 9/1993 | Foote et al. |
| 5,316,592 A | 5/1994 | Dinwoodie |
| 5,338,369 A | 8/1994 | Rawlings |
| 5,372,646 A | 12/1994 | Foote et al. |
| 5,409,549 A | 4/1995 | Mori |
| 5,460,660 A * | 10/1995 | Albright et al. ............ 136/251 |
| 5,470,397 A | 11/1995 | Foote et al. |
| 5,473,847 A | 12/1995 | Crookston |
| 5,505,788 A | 4/1996 | Dinwoodie |
| 5,524,401 A | 6/1996 | Ishikawa et al. |

(Continued)

FOREIGN PATENT DOCUMENTS

DE 3247469 7/1984

(Continued)

OTHER PUBLICATIONS

Photovoltaic Systems Design Assistance Center, "The Design of Residential Photovoltaic Systems vol. 4: The Array Design," pp. 5-13, Dec. 1988 *Sandia National Laboratories*, Albuquerque, NM.

(Continued)

*Primary Examiner*—Naoko Slack
(74) *Attorney, Agent, or Firm*—Steptoe & Johnson LLP

(57) ABSTRACT

A mounting bracket mounts a photovoltaic module to a support structure.

26 Claims, 9 Drawing Sheets

U.S. PATENT DOCUMENTS

| | | |
|---|---|---|
| 5,536,333 A | 7/1996 | Foote et al. |
| 5,571,338 A | 11/1996 | Kadonome et al. |
| 5,647,915 A | 7/1997 | Zukerman |
| 5,651,226 A | 7/1997 | Archibald |
| 5,653,222 A | 8/1997 | Newman |
| 5,678,383 A | 10/1997 | Danielewicz |
| 5,746,839 A | 5/1998 | Dinwoodie |
| 5,787,653 A | 8/1998 | Sakai et al. |
| D408,554 S | 4/1999 | Dinwoodie |
| 5,945,163 A | 8/1999 | Powell et al. |
| 6,037,241 A | 3/2000 | Powell et al. |
| 6,061,978 A | 5/2000 | Dinwoodie et al. |
| 6,065,255 A | 5/2000 | Stern et al. |
| 6,082,060 A | 7/2000 | Bauer et al. |
| 6,111,189 A | 8/2000 | Garvison et al. |
| 6,148,570 A | 11/2000 | Dinwoodie et al. |
| 6,242,685 B1 | 6/2001 | Mizukami et al. |
| 6,254,397 B1 | 7/2001 | Elmer |
| 6,269,596 B1 | 8/2001 | Ohtsuka et al. |
| 6,291,761 B1 | 9/2001 | Takada et al. |
| 6,294,723 B2 | 9/2001 | Uematsu et al. |
| 6,295,818 B1 | 10/2001 | Ansley et al. |
| 6,313,394 B1 | 11/2001 | Shugar et al. |
| 6,331,671 B1 | 12/2001 | Makita et al. |
| 6,360,491 B1 | 3/2002 | Ullman |
| 6,369,315 B1 | 4/2002 | Mizukami et al. |
| 6,410,843 B1 | 6/2002 | Kishi et al. |
| 6,414,237 B1 | 7/2002 | Böer |
| 6,437,235 B1 | 8/2002 | Komori et al. |
| 6,465,724 B1 | 10/2002 | Garvison et al. |

FOREIGN PATENT DOCUMENTS

| | | |
|---|---|---|
| DE | 3611542 | 10/1987 |
| EP | 0905795 | 3/1999 |
| EP | 0977274 | 2/2000 |
| JP | 59175168 | 10/1984 |
| JP | 59175169 | 10/1984 |
| JP | 03200376 | 9/1991 |
| JP | 05280168 | 10/1993 |
| JP | 11311002 | 11/1999 |
| JP | 2001107518 | 4/2001 |

OTHER PUBLICATIONS

Miles C. Russell and Dr. Edward C. Kern, Jr., "PV Array Designs for Flat-Roof Buildings," pp. 1129-1133, 1993, *Twenty Third IEEE Photovoltaic Specialists Conference.*

Thomas L. Dinwoodie, et al., "Optimizing Roof-Integrated Photovoltaics: A Case Study of the PowerGuard Roofing Tile," pp. 1004-1007, Dec. 5-9, 1994, First WCPEC, IEEE.

J.C. Schaefer, Review of Photovoltaic Power Plant Performance and Economics, pp. 232-238, Jun. 1990, IEEE Transactions on Energy Conversion, vol. 5, No. 2.

Christina Jennings et al., "PG&E Experience with a 10-kW Commercial Rooftop PV System," pp. 1501-1504, May 1996, 25th PVSC, IEEE.

J. Berdner et al., "Siting, Installation, and Performance Issues for Commercial Roof-Mounted PV Systems," pp. 981-985, Dec., 1994, First WCPEC, IEEE.

Bruce M. Cross, "Development, Testing and First Installations of an Integrated Solar Roof System," pp. 1020-1023, Dec. 5-9, 1994, First WCPEC, IEEE.

Bruce M. Cross, "Roof Integrated Commercial PV Design," pp. 8/1-8/4, 1994, IEE, Savoy Place, London.

Solar Vision, Inc., Director of Publications: William Dunkerley, "Photovoltaic System Design," pp. 220-223, 240-241, 246-249, 258-261, 1982, *Solarvision Publications, Harrisville, NH.*

Paul D. Maycock et al., "A Guide To The Photovoltaic Revolution," pp. 154-155, 188-189, 190-191, 1985, Rodale Press, Pennsylvania.

Andrew L. Rosenthal et al., "Performance Losses in Rooftop-Mounted PV Modules from Long-Term Environmental Exposure at Las Cruces, New Mexico," NCPV Photovoltaics Program Review, Proceedings of the 15th Conference, Sep. 1998, *AIP Conference Proceedings 462.*

* cited by examiner

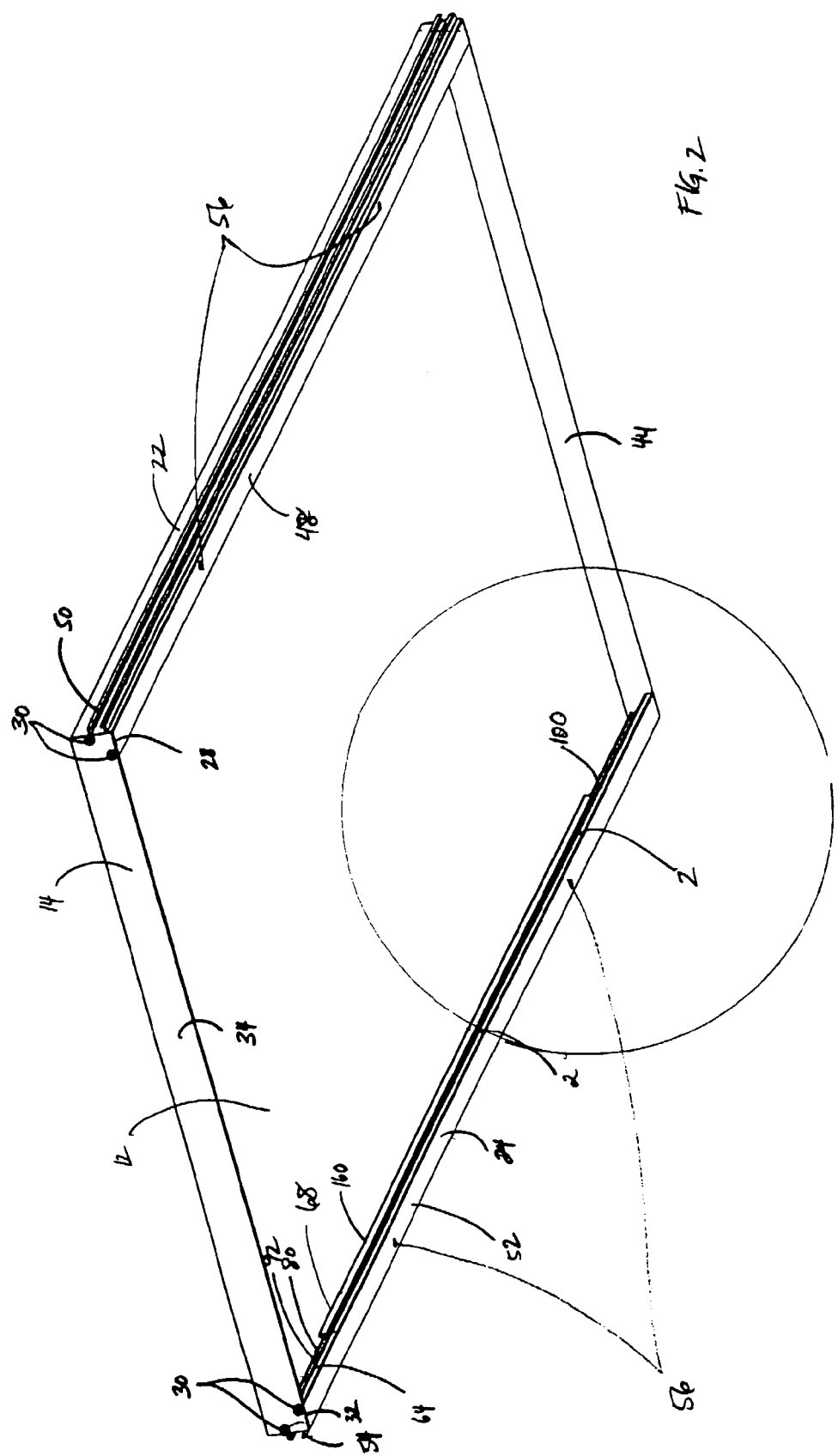

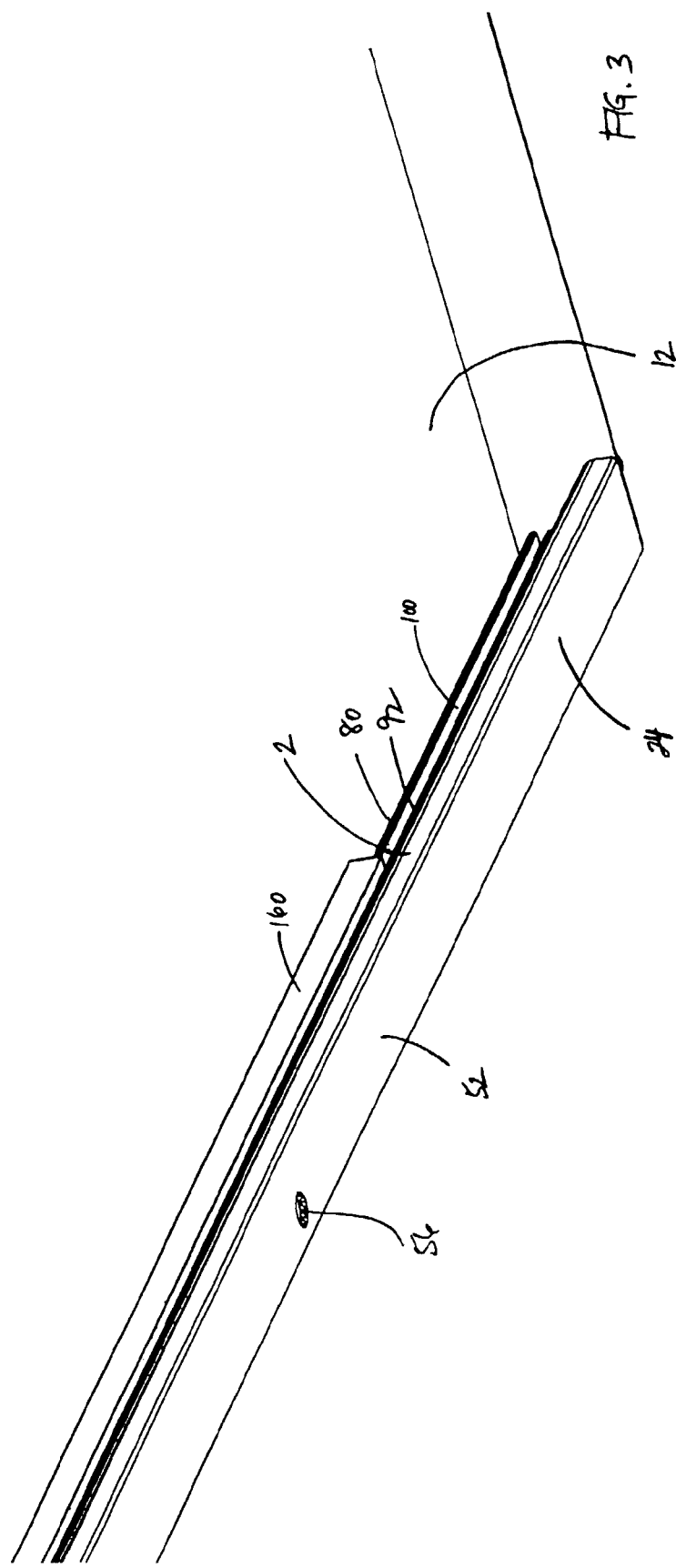

PHOTOVOLTAIC PANEL MOUNTING BRACKET

TECHNICAL FIELD

The invention relates to a bracket for mounting a photovoltaic module to a support structure.

BACKGROUND

Photovoltaic modules receive light to generate electricity. Photovoltaic modules generally are attached to a support structure, such as a roof, the ground, or a ground pad. Multiple framed photovoltaic modules can be arranged in an array to increase the amount of solar energy collected. Conventional photovoltaic module mounting systems can allow moisture to become trapped between the frame and edge of the photovoltaic module. The presence of excessive moisture can lead to delamination or electrical failure of the photovoltaic module.

SUMMARY

A mounting bracket for mounting a photovoltaic module can provide support for the photovoltaic module while isolating the module from direct contact with the frame. The mounting bracket can protect an edge of the module from physical damage and can prevent moisture from becoming trapped between the edge of the module and the frame. By reducing the presence of moisture within the frame, the photovoltaic module can be less likely to delaminate or suffer from electrical failure than other mounting structures, thereby increasing the service lifetime of the photovoltaic module.

In one aspect, a mounting bracket includes a bottom flange, an upright portion, a top flange, a first extension, and a second extension. The upright portion extends from the bottom flange. The bottom flange can include a member sized to accommodate a hardware connector. The upright portion has an inner surface and an outer surface. The top flange is opposite the bottom flange and extends from the upright portion. The top flange has a downward facing inner surface configured to adjoin an upper surface of a photovoltaic module. The first extension extends from the inner surface of the upright portion at a position between the top flange and the bottom flange. The first extension has a first surface that defines a first groove sized to accommodate an edge of the photovoltaic module with the downward facing inner surface of the top flange. The first extension has a second surface opposed to the first surface. The second extension is adjacent to the first extension and extends from the inner surface of the upright portion at a position between the first extension and the bottom flange. The second extension has a surface that defines a second groove with the second surface of the first extension. The bracket can include a glazing strip having a first portion that is directed toward the first groove and a second portion that resides within the second groove. In certain embodiments, the first portion extends in a direction that is substantially perpendicular to the downward facing inner surface of the top flange. The second groove can be sized to accommodate a hardware connector. The mounting bracket can include a cushion strip disposed on the inner surface of the upright portion in the first groove.

In certain embodiments, the mounting bracket can include an outward facing top extension projecting from and being perpendicular to the outer surface of the upright portion of the bracket. The top extension can include a terminal portion that is directed toward the bottom or top flange. The mounting bracket can further include an outward facing bottom extension. The outward facing top extension and the outward facing bottom extension can define an opening sized to accommodate a support structure, such as an elongated rail.

In another aspect, a method of mounting a photovoltaic module includes inserting an edge of a photovoltaic module having an upper surface into a mounting bracket. The bracket includes a top flange having a downward facing inner surface configured to adjoin a portion of the upper surface of the photovoltaic module. The method can include adhering the downward facing surface of the top flange to the portion of the upper surface of the photovoltaic module. The mounting bracket can include a first extension extending from the inner surface of the upright portion and can have a first surface that defines a first groove sized to accommodate an edge of the photovoltaic module with the downward facing inner surface of the top flange and a second surface opposed to the first surface. The mounting bracket can include a second extension adjacent to the first extension and extending from the inner surface of the upright portion at a position between the first extension. The second extension can have a surface that defines a second groove with the second surface of the first extension.

The method can include inserting a glazing strip in the second groove. The glazing strip can include a first portion that is directed toward the first groove and a second portion that resides within the second groove. The photovoltaic module can be positioned within the first groove such that the lower surface of the photovoltaic module contacts the first portion of the glazing strip. The method can include adhering the downward facing surface of the top flange to the upper surface of the photovoltaic module by applying an adhesive to the downward facing surface of the top flange. In certain embodiments, the method includes applying an adhesive to the upward facing surface of the photovoltaic module. The method can include curing the adhesive. In some embodiments, the method includes attaching the mounting fixture to a support structure.

In another aspect, a framed photovoltaic module includes a photovoltaic module, a mounting bracket, and an adhesive. The photovoltaic module has an upper surface and a lower surface. The module has a first edge and a second edge, which are substantially parallel to each other. The mounting bracket is positioned along the first edge. The mounting bracket includes a bottom flange, an upright portion, a top flange, a first extension, and a second extension. The upright portion extends from the bottom flange and has an inner surface and an outer surface. The top flange is opposite the bottom flange and extends from the upright portion. The top flange has a downward facing inner surface configured to adjoin an upper surface of a photovoltaic module. The first extension extends from the inner surface of the upright portion at a position between the top flange and the bottom flange. The first extension has a first surface that defines a first groove sized to accommodate the first edge of the photovoltaic module with the downward facing inner surface of the top flange. The first extension has a second surface opposed to the first surface. The second extension is adjacent to the first extension and extends from the inner surface of the upright portion at a position between the first extension and the bottom flange. The second extension has a surface that defines a second groove with the second surface of the first extension. The adhesive is disposed between the downward facing surface of the top flange and the upper surface of the photovoltaic module.

The photovoltaic module can be positioned within the first groove such that the lower surface of the photovoltaic module contacts a first portion of a glazing strip. The glazing strip can include a first portion that is directed toward the first groove and a second portion that resides within the second groove. The framed photovoltaic module can include a second mounting bracket positioned along the second edge. The second mounting bracket can include a bottom flange, an upright portion extending from the bottom flange and can have an inner surface and an outer surface. The second mounting bracket can have atop flange opposite the bottom flange that extends from the upright portion and can have a downward facing inner surface configured to adjoin an upper surface of a photovoltaic module. The second mounting bracket can have a first extension extending from the inner surface of the upright portion at a position between the top flange and the bottom flange and can have a first surface that defines a first groove sized to accommodate an edge of the photovoltaic module with the downward facing inner surface of the top flange and a second surface opposed to the first surface. The second mounting bracket can have a second extension adjacent to the first extension and extending from the inner surface of the upright portion at a position between the first extension and the bottom flange and having a surface that defines a second groove with the second surface of the first extension. An adhesive can be disposed between the downward facing surface of the top flange and the upper surface of the photovoltaic module.

In certain embodiments, the framed photovoltaic module can include a first end plate attached to a first end of the first mounting bracket and to a first end of the second mounting bracket. The framed photovoltaic module further can include a second end plate attached to a second end of the first mounting bracket and to a second end of the second mounting bracket.

The details of one or more embodiments are set forth in the accompanying drawings and the description below. Other features, objects, and advantages will be apparent from the description and drawings, and from the claims.

DESCRIPTION OF DRAWINGS

FIG. 2 is a perspective view of the bottom of the framed photovoltaic module shown in FIG. 1.

FIG. 3 is a perspective view of a corner of the framed photovoltaic module shown in FIG. 2.

DETAILED DESCRIPTION

Figure 1:
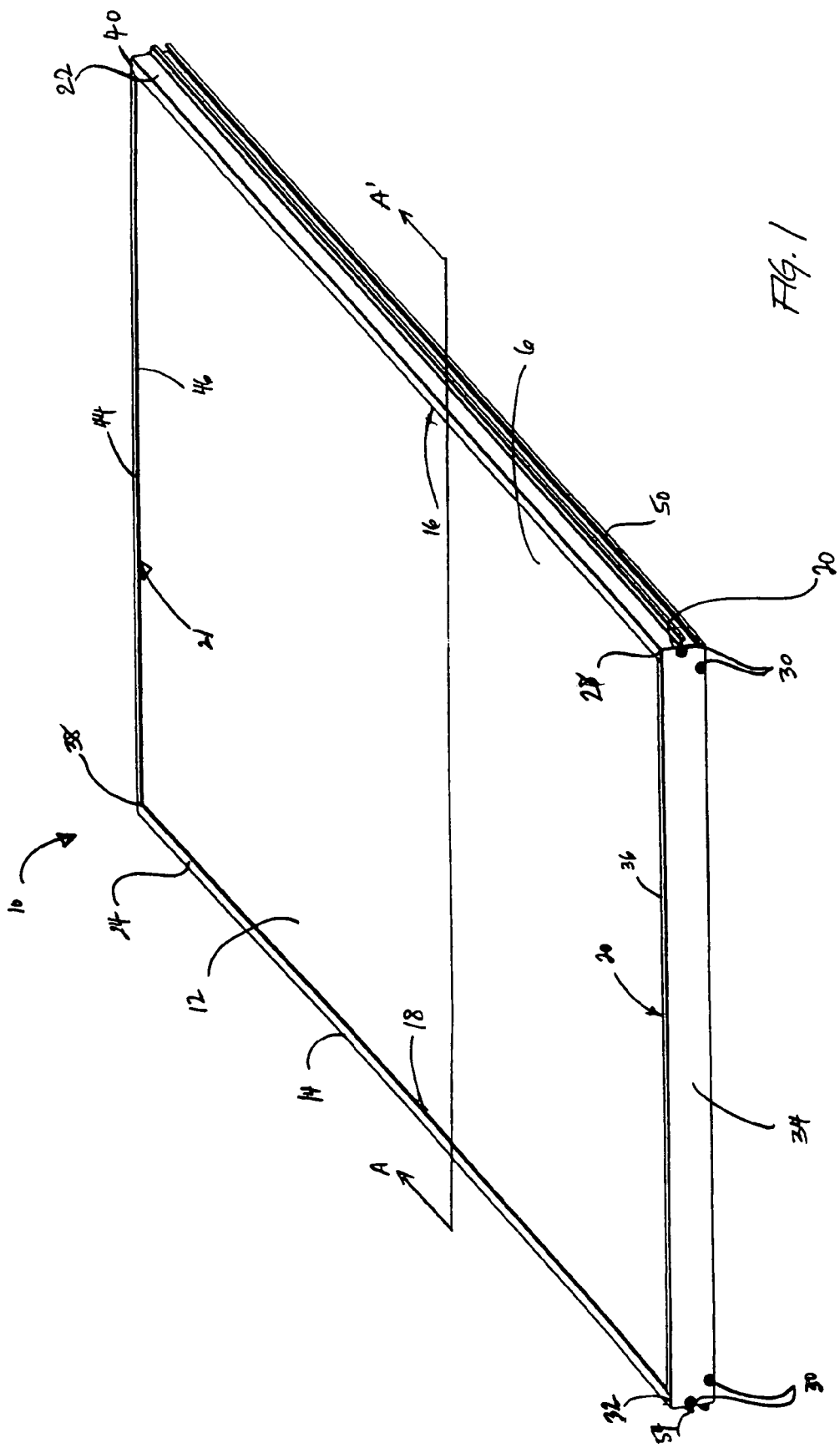
FIG. 1 is a perspective view of a framed photovoltaic module.

Referring to FIG. 1, a framed photovoltaic module 10 includes a photovoltaic module 12 and a peripheral frame 14. Photovoltaic module 12 has a quadrangular shape with two parallel elongated edges 16 and 18 and two parallel transverse edges 20 and 21, each of which is generally perpendicular to elongated edges 16 and 18. Photovoltaic module 12 is surrounded by frame 14 along edges 16, 18, 20 and 21. Frame 14 includes a first mounting bracket 22 that runs parallel to elongated edge 16 and a second mounting bracket 24 that runs parallel to elongated edge 18. The end 28 of mounting bracket 22 and the end 32 of the mounting bracket 24 are attached via connecting hardware 30 to an end plate 34. Connecting hardware 30 can be a screw, a rivet, a nail, a weld, an adhesive, or a braze joint. End plate 34 includes a top flange 36 that overlaps a portion of the upper surface 6 of the photovoltaic module 12 so as to protect the edge of the module and to provide a finished appearance. The opposite end 38 of bracket 24 and the opposite end 40 of bracket 22 are attached via connecting hardware (not shown) to a second end plate 44. End plate 44 includes a top flange 46 that overlaps a portion of upper surface 6 of photovoltaic module 12. Top flange 36 and top flange 46 can cover a minimal portion of the upper surface of photovoltaic module 12 so as not to diminish the efficiency of the module while protecting the panel edge. The mounting brackets 22 and 24 and end plates 34 and 44 are fastened together so as to form a rectangular frame 14 that surrounds the peripheral edges of the photovoltaic module 12. The frame pieces typically are made from materials that can withstand exposure to extremes in temperature and moisture and can be made of the same material or different materials. Examples of weather-resistant materials include a metal, a metal alloy, a plastic, or a structural composite. For example, the frame can be extruded aluminum.

Referring to FIG. 2, which shows the bottom of frame 14, mounting brackets 22 and 24 include a bottom flange 48 and 52, respectively. Each bottom flange 48 or 52 can be secured to a support structure via connecting hardware via hole 56. End 28 of bottom flange 48 and end 32 of bottom flange 52 can be secured to an end plate 34 via connecting hardware 30. Similarly, the bottom flanges at the opposite ends (not shown) of each parallel bracket 22 and 24 can be secured to end plate 44 in a similar fashion. Referring to FIGS. 2 and 3, the mounting bracket 24 includes an upright portion 64 having a groove 100 defined by a bottom extension 92 and a top extension 80 that project from the inner surface 2 of the upright portion 64 (described in detail below). Mounting bracket 22 also includes these features but are not shown in the views depicted in FIGS. 2 and 3. A portion of a substantially L-shaped glazing strip 160 resides within groove 100. Glazing strip 160 does not need to extend the full length of groove 100. A second portion 168 of the glazing strip 160, which is substantially perpendicular to the portion that resides in groove 100, is directed toward the bottom surface of the photovoltaic module 12.

Referring to FIGS. 1 and 2, mounting bracket 22 optionally includes an outward facing attachment member 50 (described in detail below) configured to secure the frame 14 to a support structure (not shown), such as a rail or other structure on a roof. Mounting bracket 24 similarly can include an outward facing attachment member 54. Each of attachment members 50 and 54 can have a substantially C-shaped cross-section. However, the shape of the outward facing attachment member can have any configuration and is generally dictated by the bracket used to attach the frame to the support structure.

Figure 4A:
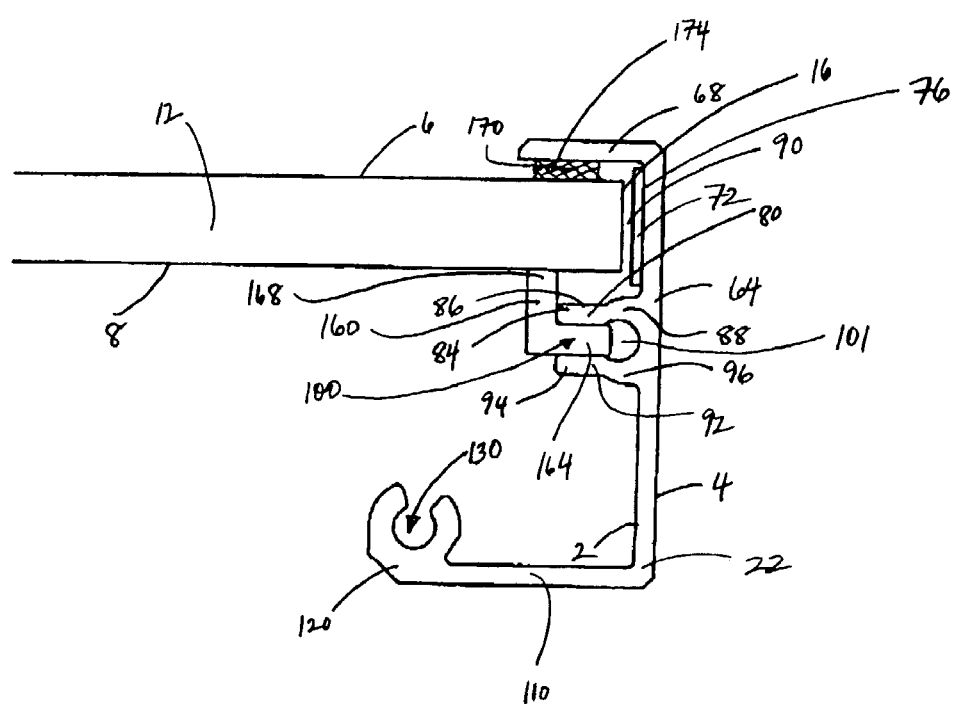
FIG. 4A is a partial cross-sectional view of a framed photovoltaic module.
Figure 4B:
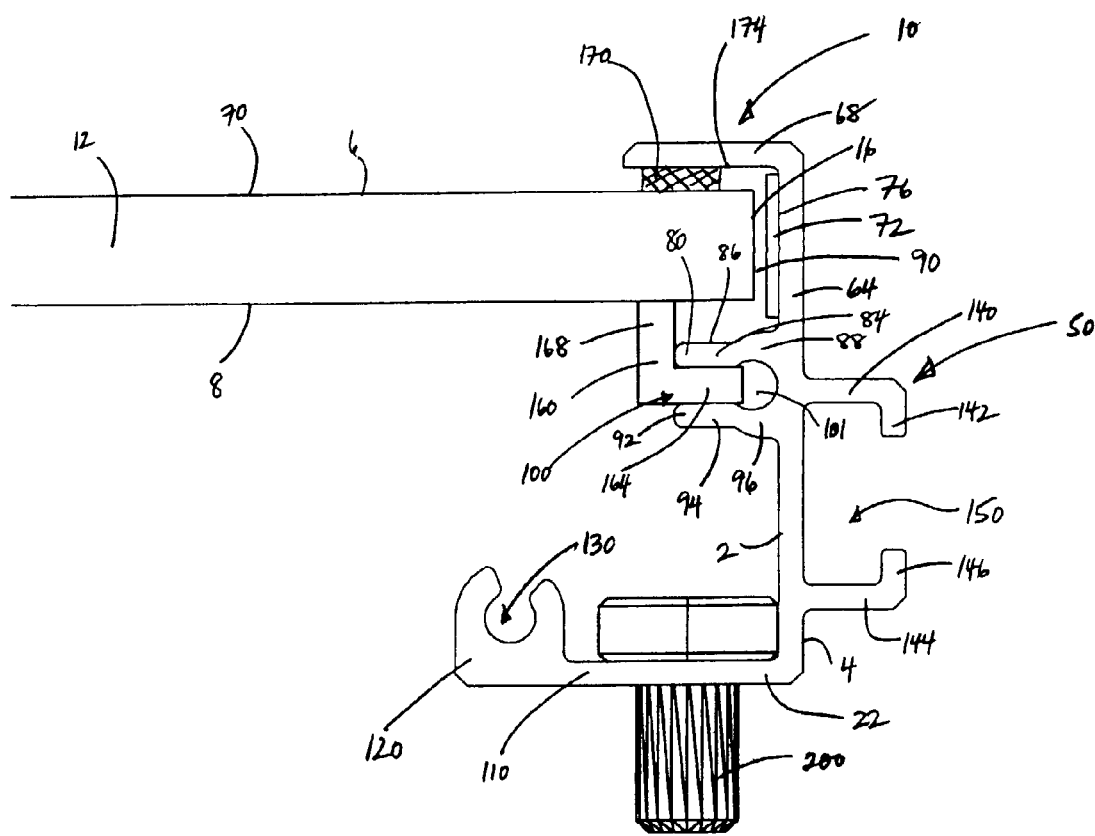
FIG. 4B is a partial cross-sectional view of the framed photovoltaic module shown in FIG. 1 along line A–A'.

Referring to FIGS. 4A and 4B, mounting bracket 22 includes an upright portion 64 having an inner surface 2 and an outer surface 4. A top flange 68 and a bottom flange 110 extend in a substantially perpendicular direction from opposite ends of the upright portion 64. Bottom flange 110 can be longer than top flange 68 and can terminate in an attachment member 120 having an opening 130 sized to receive connecting hardware (not shown). Top flange 68 has a downward facing inner surface 174 configured to secure to a portion of the upper surface 6 of a photovoltaic module 12.

An adhesive 170 secures the downward facing inner surface 174 of the top flange 68 to the periphery of the upper surface 6 of the photovoltaic module 12. Adhesive 170 can be any adhesive that is capable of fixing photovoltaic module 12 to mounting bracket 22. Due to prolonged exposure to heat, wind, cold, rain, and frozen precipitation, a weather resistant adhesive is preferred. Depending on climate, it also may be desirable to use an adhesive that has elastomeric properties that can withstand repeated freeze-thaw cycles. Adhesive 170 can include, for example, a hot melt adhesive, a pressure sensitive adhesive, or a glue, such as, for example, a silicone, one or two component urethane, or epoxy. The bracket 22 includes an inward facing extension 80 that projects from the inner surface 2 of the upright portion 64 at a position between the top flange 68 and the bottom flange 110. Typically, extension 80 is shorter than top flange 68 and includes a distal portion 84 that is substantially parallel to top flange 68 and a curved portion 88 that is proximal to upright portion 64. The upper surface 86 of extension 80 and downward facing surface 174 of top flange 68 define a groove 90 sized to accommodate an edge 16 of the photovoltaic module 12. Typically, extension 80 runs the entire length of mounting bracket 22.

An optional cushioning strip 72 can reside on the inner surface 76 of the upright portion 64 of groove 90. Cushioning strip 72 protects the edge of the photovoltaic module 12 from being damaged due to contact with the upright portion 64 of bracket 60 during placement of photovoltaic module 12 into the mounting bracket 22, and during handling of the framed module. Accordingly, cushioning strips typically are made of a resilient material having a hardness between Shore OO durometer of 20 and Shore A durometer of 80, or Shore A durometer of 20 to 60, such as a Shore A durometer of 40. The resilient material can include, for example, a rubber, such as butyl rubber or silicone rubber, a foam or a polymeric material, such as a urethane, neoprene, or poly (vinyl chloride) (PVC). Photovoltaic module 12 is positioned within groove 90 so that the edge 16 of the module does not directly contact the inner surface 2 of the upright portion 64 or cushioning strip 72, if present. Additional spacer and/or cushioning materials (not shown) can be used to prevent or minimize contact between the upper surface 6, the lower surface 8, or the edge 16 of the photovoltaic module 12 and the inward facing surfaces 76, 86, and 174 that define groove 90.

The mounting bracket 22 includes a second extension 92 that projects from the inner surface 2 of the upright portion 64 at a position between the extension 80 and bottom flange 110. Extension 92 can be a mirror image of extension 80. The second extension 92 can run the entire length of mounting bracket 22. The second extension 92 includes a curved portion 96 that is proximal to the inner surface 2 of the upright portion 64 and a distal portion 94 that can be parallel to distal portion 84 of extension 80. The curved portions of extension 80 and extension 92 define a receiver 101 sized to accommodate connecting hardware (not shown). The distal portion 84 of extension 80 and the distal portion 94 of extension 92, which are substantially parallel, are spaced so as to form groove 100, which is sized to accommodate a portion of glazing strip 160.

Glazing strip 160 can have an L-shaped cross section with a bottom portion 164 that resides within groove 100. The glazing strip 160 can be extruded from a semi-rigid plastic material, such as PVC. The glazing strip 160 temporarily supports the photovoltaic module 12 within groove 90 prior to application and curing of adhesive 170. Once the photovoltaic module 12 is positioned within groove 90 of bracket 22, the top portion 168 of glazing strip 160 abuts the bottom surface 8 of photovoltaic module 12. The glazing strip 160 can be provided with the bracket 22 or can be inserted into groove 100 just prior to insertion of the photovoltaic module 12 into groove 90 of the mounting bracket.

The adhesive 170 can be introduced between downward facing surface 174 and upper surface 6 after the photovoltaic module 12 is positioned within groove 90. Alternatively, or in combination with introducing the adhesive after positioning the module in the groove, the adhesive 170 can be applied to the downward facing surface 174 of the top flange 68 or to a portion of the upper surface 6 at the periphery of the photovoltaic module 12 prior to positioning the module in the groove. For example, a pressure sensitive adhesive, which can be optionally protected with a release liner, can be provided on the downward facing surface 174 of the top flange 68. After removal of the release liner, the photovoltaic module 12 is inserted into groove 90 and secured to the downward facing surface 174 via contact with the pressure sensitive adhesive. Once cured, adhesive 170 secures photovoltaic module 12 to mounting fixture 22. Since the glazing strip is not intended to provide long-term structural support, it may be removed or replaced after the adhesive has cured.

The mounting bracket 22 isolates the photovoltaic module 12 from direct contact with the frame 14. By isolating the module 12 from frame 14, the edge 16 of the module 12 remains exposed when seated within groove 90. This construction facilitates water drainage and air flow through the mounting bracket 22 and around the edges of the photovoltaic module 12.

The framed photovoltaic module 10 can be mounted directly or indirectly to a support structure. For example, as shown in FIG. 4B, a framed module 10 can be mounted to a support structure (not shown) directly using a hardware connector 200 (e.g., a screw, nail, or rivet, a weld, an adhesive, a braze joint) positioned within an opening (not shown; hole 56 in FIG. 2) in the bottom flange 110 of the mounting bracket 22. Alternatively, or in addition, bracket 22 optionally can include an outward facing attachment member 50 (shown in FIG. 4B) for securing the bracket 22 indirectly to a support structure.

Referring to FIG. 4B, the attachment member 50 includes an outward facing L-shaped top extension 140 that is perpendicular to the upright portion 64 of bracket 22. The terminal end 142 of top extension 140 is directed toward the bottom flange 110. Bracket 22 includes an outward facing L-shaped bottom extension 144 that is perpendicular to the upright portion 64. The terminal end 146 of bottom extension 144 can be directed toward the top flange 68. Outward facing top extension 140 and outward facing bottom extension 144 define a C-shaped groove 150 that is sized to accommodate a support structure, such an elongated rail, which can be used to secure the frame to, for example, a roof, the ground, a ground pad, a pipe support structure, a rack, or other type of mounting system.

Figure 4C:
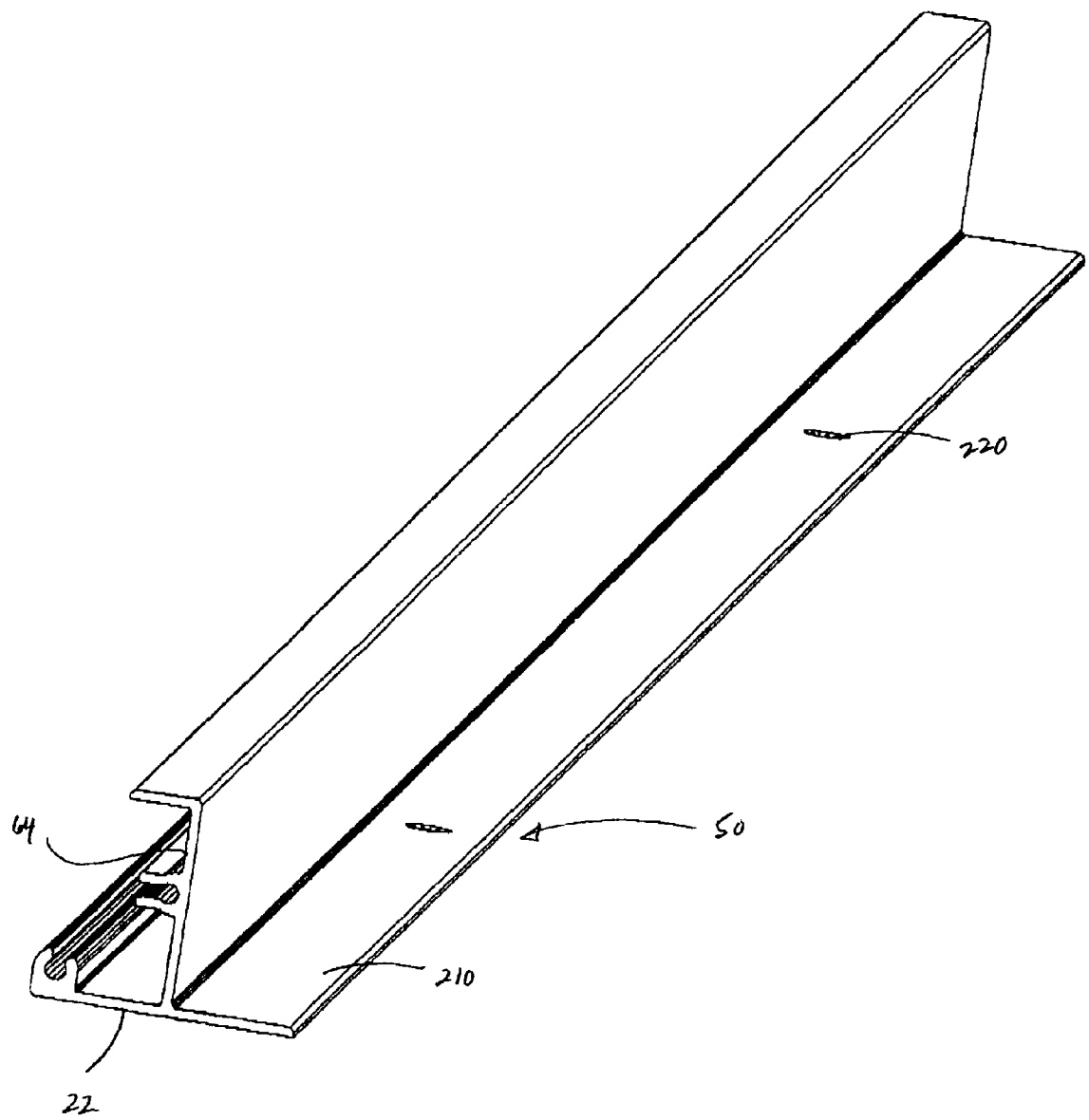
FIG. 4C is a perspective cross-sectional view of a mounting bracket.

Referring to FIG. 4C, in another embodiment, the attachment member 50 includes an outward facing extension 210 that is perpendicular to the upright portion 64 of mounting bracket 22. The outward facing extension 210 can be attached to a support structure (as described above) by connecting hardware 220.

Figure 5A:
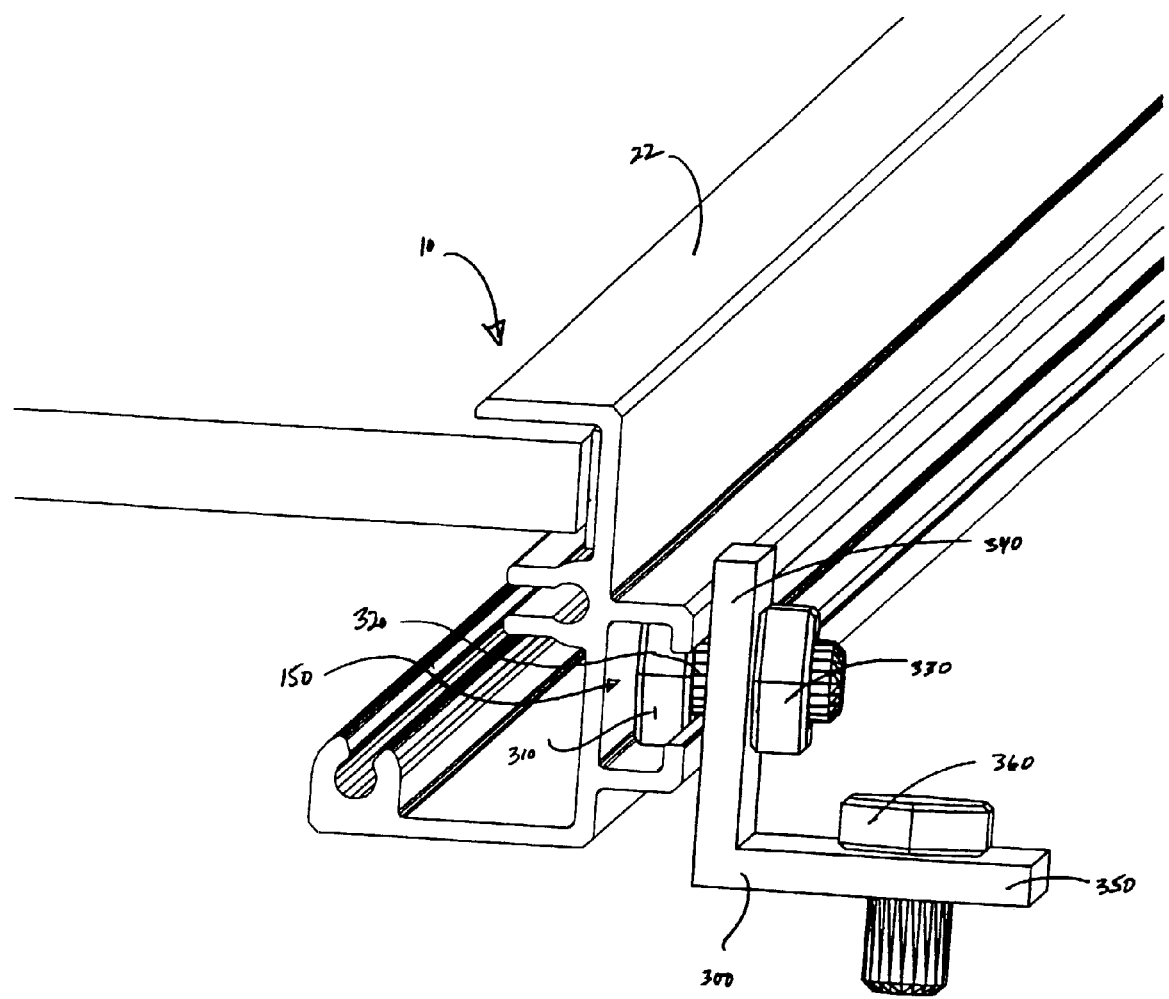
FIG. 5A is a perspective cross-sectional view of a framed photovoltaic module.
Figure 5B:
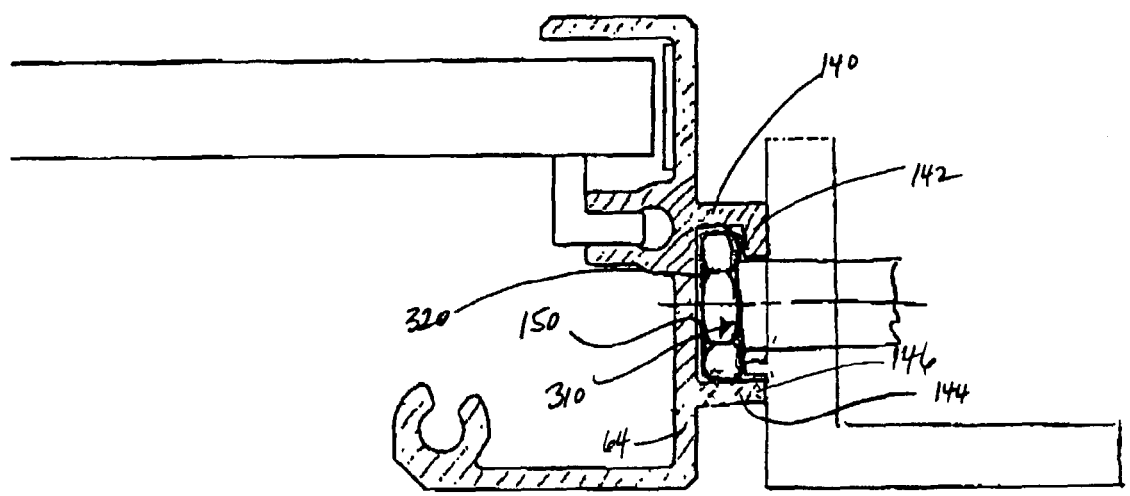
FIG. 5B is a cross-sectional view of a framed photovoltaic module.

Referring to FIG. 5A, a framed photovoltaic module 10 is shown that is mounted to a support structure (not shown) by a bracket 300. The head 310 of a bolt 320 can slide into groove 150 of mounting bracket 22, allowing it to be positioned in a location to secure to a support structure. The bolt 320 is secured through an opening (not shown) in the top flange 340 of an L-shaped bracket 300 by a fastener 330 (e.g., a nut). The bracket 300 optionally can be mounted to a support structure (not shown) via a hardware connector 360 that passes through an opening (not shown) in the bottom flange 350 of bracket 300. Referring to FIG. 5B, terminal portion 146 of the bottom extension 144 extends away from upright portion 64 and does not extend toward terminal portion 142 of the top extension 140. The structure opens groove 150 to facilitate inserting connector 320 into the groove. The head 310 of connector 320 can be angled relative to upright portion 64 to seat the head 310 in groove 150 anywhere along the length of the groove.

Figure 6:
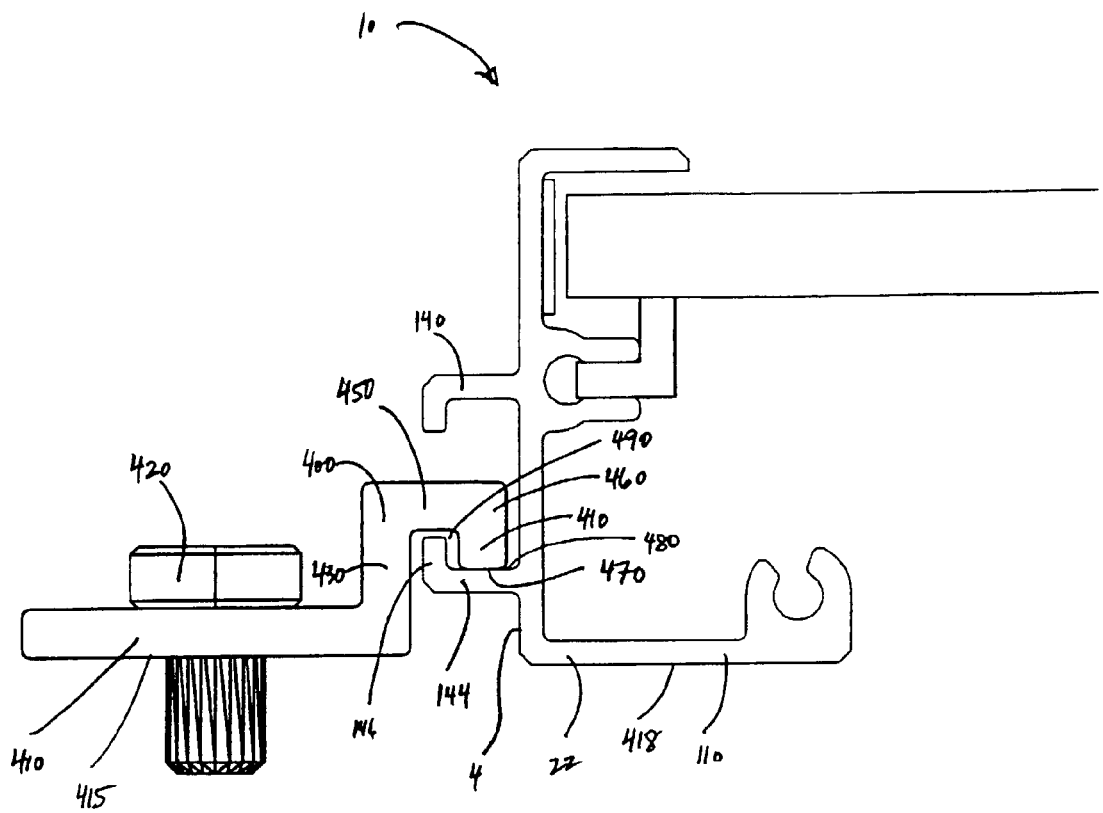
FIG. 6 is a cross-sectional view of a framed photovoltaic module.

Referring to FIG. 6, the framed photovoltaic module 10 can be attached to a support structure (not shown) via bracket 400 that rests on the upper surface 480 of the outward facing bottom extension 144 of mounting bracket 22. Bracket 400 includes a lateral portion 410 having an opening (not shown) sized to accommodate a hardware connector 420, which can be used to secure the bracket 400 to a support structure (not shown). An upright portion 430 extends from the lateral portion 410 and is directed toward the top extension 140 of the mounting bracket 22. A short lateral portion 450 extends perpendicularly from upright portion 430 and is directed toward the outer surface 4 of the bracket 22. The lateral portion 450 terminates in a short flange 460 that is directed toward the upper surface 480 of the bottom extension 144. The end 470 of the downward facing flange 460 abuts the upper surface 480 of the bottom extension 144. The upright portion 430 and the flange 460 of the bracket 400 define a groove 490 sized to accommodate the terminal portion 146 of the bottom extension 144. The upright portion 430, lateral portion 450, and flange 460 of bracket 400 form a latching structure that prevents the bracket 400 from becoming uncoupled from the mounting bracket 22. The lower surface 415 of lateral portion 410 and the lower surface 418 of bottom flange 110 of mounting bracket 22 can rest on a surface of a support structure (not shown). The bracket 400 can secure the framed photovoltaic module 10 to the support structure.

A number of embodiments of the invention have been described. Nevertheless, it will be understood that various modifications may be made without departing from the spirit and scope of the invention.

What is claimed:

1. A mounting bracket comprising:
a bottom flange;
an upright portion extending from the bottom flange and having an inner surface and an outer surface;
a top flange opposite the bottom flange, extending from the upright portion and having a downward facing inner surface configured to adjoin an upper surface of a photovoltaic module;
a first extension extending from the inner surface of the upright portion at a position between the top flange and the bottom flange and having a first surface that defines a first groove sized to accommodate an edge of the photovoltaic module with the downward facing inner surface of the top flange and a second surface opposed to the first surface; and
a second extension adjacent to the first extension and extending from the inner surface of the upright portion at a position between the first extension and the bottom flange and having a surface that defines a second groove with the second surface of the first extension; and
a glazing strip having a first portion that is directed toward the first groove and a second portion that resides within the second groove.

2. The mounting bracket of claim 1, wherein the first portion and the second portion of the glazing strip are substantially perpendicular to each other.

3. The mounting bracket of claim 1, wherein the first portion extends in a direction that is substantially perpendicular to the downward facing inner surface of the top flange.

4. The mounting bracket of claim 1, wherein the bottom flange includes a member sized to accommodate a hardware connector.

5. The mounting bracket of claim 1, wherein the second groove is sized to accommodate a hardware connector.

6. The mounting bracket of claim 1, further comprising a cushion strip disposed on the inner surface of the upright portion in the first groove.

7. A mounting bracket comprising:
a bottom flange;
an upright portion extending from the bottom flange and having an inner surface and an outer surface;
a top flange opposite the bottom flange, extending from the upright portion and having a downward facing inner surface configured to adjoin an upper surface of a photovoltaic module;
an outward facing top extension projecting from and being perpendicular to the outer surface of the upright portion of the bracket;
a first extension extending from the inner surface of the upright portion at a position between the top flange and the bottom flange and having a first surface that defines a first groove sized to accommodate an edge of the photovoltaic module with the downward facing inner surface of the top flange and a second surface opposed to the first surface; and
a second extension adjacent to the first extension and extending from the inner surface of the upright portion at a position between the first extension and the bottom flange and having a surface that defines a second groove with the second surface of the first extension.

8. The mounting bracket of claim 7, further comprising an outward facing bottom extension, wherein the outward facing top extension and the outward facing bottom extension define an opening sized to accommodate a support structure.

9. The mounting bracket of claim 8, wherein the support structure is an elongated rail.

10. The mounting bracket of claim 7, wherein top extension includes a terminal portion that is directed toward the bottom flange.

11. The mounting bracket of claim 10, wherein the bracket further comprises an outward facing bottom extension, wherein the outward facing top extension and the outward facing bottom extension define an opening sized to accommodate a support structure.

12. The mounting bracket of claim 11, wherein the bottom extension includes a terminal portion that is directed toward the top flange.

13. A method of mounting a photovoltaic module comprising:
inserting an edge of a photovoltaic module having an upper surface into a mounting bracket comprising a top flange having a downward facing inner surface configured to adjoin a portion of the upper surface of the photovoltaic module;

adhering the downward facing surface of the top flange to the portion of the upper surface of the photovoltaic module; and inserting a glazing strip in the second groove, the glazing strip having a first portion that is directed toward the first groove and a second portion that resides within the second groove.

14. The method of claim 13, wherein the mounting bracket further comprises:

a first extension extending from the inner surface of the upright portion at a position between the top flange and a bottom flange of the mounting bracket and having a first surface that defines a first groove sized to accommodate an edge of the photovoltaic module with the downward facing inner surface of the top flange and a second surface opposed to the first surface; and a second extension adjacent to the first extension and extending from the inner surface of the upright portion at a position between the first extension and the bottom flange and having a surface that defines a second groove with the second surface of the first extension.

15. The method of claim 14, wherein adhering the downward facing surface of the top flange to the upper surface of the photovoltaic module includes applying an adhesive to the downward facing surface of the top flange.

16. The method of claim 15, wherein the adhesive comprises silicone.

17. The method of claim 15 further comprising curing the adhesive.

18. The method of claim 14, wherein adhering the downward facing surface of the top flange to the upper surface of the photovoltaic module includes applying an adhesive to the upward facing surface of the photovoltaic module.

19. The method of claim 18, wherein the adhesive comprises silicone.

20. The method of claim 18, further comprising curing the adhesive.

21. The method of claim 14, further comprising attaching the mounting bracket to a support structure.

22. The method of claim 13, wherein the photovoltaic module is positioned within the first groove such that the lower surface of the photovoltaic module contacts the first portion of the glazing strip.

23. A framed photovoltaic module comprising:

a photovoltaic module having an upper surface and a lower surface, wherein the module has a first edge and a second edge, and wherein the first and second edges are substantially parallel to each other;

a mounting bracket positioned along the first edge, the mounting bracket comprising:

a bottom flange;

an upright portion extending from the bottom flange and having an inner surface and an outer surface;

a top flange opposite the bottom flange, extending from the upright portion and having a downward facing inner surface configured to adjoin an upper surface of a photovoltaic module;

a first extension extending from the inner surface of the upright portion at a position between the top flange and the bottom flange and having a first surface that defines a first groove sized to accommodate the first edge of the photovoltaic module with the downward facing inner surface of the top flange and a second surface opposed to the first surface; and a second extension adjacent to the first extension and extending from the inner surface of the upright portion at a position between the first extension and the bottom flange and having a surface that defines a second groove with the second surface of the first extension; and an adhesive disposed between the downward facing surface of the top flange and the upper surface of the photovoltaic module, wherein the photovoltaic module is positioned within the first groove such that the lower surface of the photovoltaic module contacts a first portion of a glazing strip, and wherein the glazing strip includes a first portion that is directed toward the first groove and a second portion that resides within the second groove.

24. The framed photovoltaic module of claim 23, further comprising a second mounting bracket positioned along the second edge comprising:

a bottom flange;

an upright portion extending from the bottom flange and having an inner surface and an outer surface;

a top flange opposite the bottom flange, extending from the upright portion and having a downward facing inner surface configured to contact an upper surface of a photovoltaic module;

a first extension extending from the inner surface of the upright portion at a position between the top flange and the bottom flange and having a first surface that defines a first groove sized to accommodate an edge of the photovoltaic module with the downward facing inner surface of the top flange and a second surface opposed to the first surface; and a second extension adjacent to the first extension and extending from the inner surface of the upright portion at a position between the first extension and the bottom flange and having a surface that defines a second groove with the second surface of the first extension; and an adhesive disposed between the downward facing surface of the top flange and the upper surface of the photovoltaic module.

25. The framed photovoltaic module of claim 24, further comprising a first end plate attached to a first end of the first mounting bracket and to a first end of the second mounting bracket.

26. The framed photovoltaic module of claim 25, further comprising a second end plate attached to a second end of the first mounting bracket and to a second end of the second mounting bracket.

* * * * *